(12) United States Patent
Shimizu et al.

(10) Patent No.: US 8,421,979 B2
(45) Date of Patent: Apr. 16, 2013

(54) DISPLAY PANEL AND DISPLAY DEVICE INCLUDING THE SAME

(75) Inventors: Yukio Shimizu, Osaka (JP); Takashi Matsui, Osaka (JP); Motoji Shiota, Osaka (JP); Keigo Aoki, Osaka (JP); Hiroki Nakahama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 190 days.

(21) Appl. No.: 13/003,790

(22) PCT Filed: May 21, 2009

(86) PCT No.: PCT/JP2009/059331
§ 371 (c)(1),
(2), (4) Date: Jan. 12, 2011

(87) PCT Pub. No.: WO2010/013530
PCT Pub. Date: Feb. 4, 2010

(65) Prior Publication Data
US 2011/0122337 A1    May 26, 2011

(30) Foreign Application Priority Data
Jul. 28, 2008   (JP) .................................. 2008-193795

(51) Int. Cl.
*G02F 1/1345* (2006.01)
(52) U.S. Cl.
USPC ........................................................ 349/151
(58) Field of Classification Search .................... 349/151
See application file for complete search history.

(56) References Cited

U.S. PATENT DOCUMENTS

| 5,506,401 | A | 4/1996 | Segawa et al. |
| 6,738,123 | B1 * | 5/2004 | Takahashi et al. ............ 349/152 |
| 2003/0092326 | A1 | 5/2003 | Nishikawa et al. |
| 2005/0230773 | A1 | 10/2005 | Saito et al. |
| 2006/0044505 | A1 | 3/2006 | Nakazawa |

FOREIGN PATENT DOCUMENTS

| CN | 1683961 A | 10/2005 |
| CN | 1877404 A | 12/2006 |
| JP | 05-182997 A | 7/1993 |
| JP | 07-099214 A | 4/1995 |
| JP | 10-154727 A | 6/1998 |
| JP | 10-206877 A | 8/1998 |
| JP | 11-031717 A | 2/1999 |
| JP | 2002-134559 A | 5/2002 |
| JP | 2004-138700 A | 5/2004 |
| JP | 2005-108997 A | 4/2005 |
| JP | 2006-066676 A | 3/2006 |

(Continued)

OTHER PUBLICATIONS

Official Communication issued in International Patent Application No. PCT/JP2009/059331, mailed on Jun. 23, 2009.

*Primary Examiner* — James Dudek
(74) *Attorney, Agent, or Firm* — Keating & Bennett, LLP

(57) ABSTRACT

A drive IC chip (21) including a circuit for driving a display region (41) is mounted on a panel substrate (11). An anisotropic conductive film (31) is interposed between the panel substrate (11) and the drive IC chip (21) and electrically connects the bump electrodes (22) of the drive IC chip (21) and the electrode pads (27) of the panel substrate (11). The anisotropic conductive film (31) is arranged to extend beyond all side surfaces (21b to 21d) other than one specific side surface (21a) of the drive IC chip (21).

11 Claims, 7 Drawing Sheets

FOREIGN PATENT DOCUMENTS

| | | |
|---|---|---|
| JP | 2006-114529 A | 4/2006 |
| JP | 2006-235348 A | 9/2006 |
| JP | 2006-243008 A | 9/2006 |

\* cited by examiner

DISPLAY PANEL AND DISPLAY DEVICE INCLUDING THE SAME

TECHNICAL FIELD

The present invention relates to a display panel and more particularly relates to the configuration of a display panel in which an IC (integrated circuit) chip is mounted on a panel substrate. The present invention also relates to a display device including such as a display panel.

BACKGROUND ART

Conventional liquid crystal display panels are widely used as one type of display panel, and are incorporated in electronic devices such as information devices, TV devices and amusement devices. Specific examples of the electronic devices incorporated in the liquid crystal display panels include mobile telephones, PDAs (personal digital assistant), DVD players, mobile game devices, notebook PCs, PC monitors and TV sets.

The configuration of the conventional liquid crystal display panel will be described with reference to FIGS. 8 and 9. FIG. 8 is a schematic plan view showing the configuration of the conventional liquid crystal display panel. FIG. 9 is a schematic cross-sectional view taken along line D-D.

The conventional liquid crystal display panel 100 includes two panel substrates 101 and 102 that are formed of glass. The two panel substrates 101 and 102 are bonded by a frame-shaped seal 103 with a predetermined gap left therebetween in a vertical direction. Liquid crystal 104 is sealed in the space enclosed by the two panel substrates 101 and 102 and the seal 103. A predetermined region substantially in the middle portion of the liquid crystal display panel 100 is a display region 105. The portion outside the display region 105 is a non-display region 106 where a liquid crystal display is not produced.

On the surface of the lower panel substrate (hereinafter also referred to as a "matrix substrate") 101 of the two panel substrates 101 and 102, a plurality of switching elements such as TFTs (thin film transistor) and pixel electrodes (they are not shown) to which the switching elements are connected are arranged in a matrix. A plurality of scanning signal lines and data signal lines (they are not shown) that drive the switching elements are formed such that they intersect each other. On the other hand, on the upper panel substrate (hereinafter also referred to as an "opposite substrate") 102, as shown in FIG. 9, the layers of an opposite electrode 107 and a color filter 108 are sequentially formed from the side close to the liquid crystal 104. The matrix substrate 101 and the opposite substrate 102 are arranged such that the pixel electrodes and the opposite electrode 102 face each other, and this results in the formation of the display region 105 described above.

The matrix substrate 101 among the two panel substrates 101 and 102 is formed such that the matrix substrate 101 is larger in planar dimensions than the opposite substrate 102. On the portion of the matrix substrate 101 extending outward more than the opposite substrate 102, a drive IC chip 109 including a circuit for driving the display region 105 is mounted by a COG (chip on glass) method. Here, the drive IC chip 109 is an IC chip into which a drive circuit generating data signals (signals fed to the data signal lines described above) and a drive circuit generating scanning signals (signals fed to the scanning signal lines described above) are integrated.

When the drive IC chip 109 is mounted on the matrix substrate 101 by the COG method, an ACF (anisotropic conductive film) 110 is generally used to achieve the mounting. The technology for mounting an IC chip on a substrate using an ACF is conventionally known (for example, see patent documents 1 to 3).

A procedure for mounting the drive IC chip 109 on the matrix substrate 101 by the COG method will now be described with reference to FIG. 10. The ACF 110 is placed on a predetermined region of the matrix substrate 101. Thereafter, electrode pads 111 formed on the matrix substrate 101 and bump electrodes 112 of the drive IC chip 109 are positioned such that they coincide with each other, and thermocompression bonding is performed by a thermocompression bonding tool 120. In this way, the drive IC chip 109 and the matrix substrate 101 are bonded together.

RELATED ART DOCUMENT

Patent Document

Patent document 1: JP-A-H7-99214
Patent document 2: JP-A-H5-182997
Patent document 3: JP-A-2002-134559

DISCLOSURE OF THE INVENTION

Problems to be Solved by the Invention

Incidentally, when the ACF 110 is used to mount the drive IC chip 109 on the matrix substrate 101, the relationship between the ACF 110 and the drive IC chip 107 is as shown in FIG. 8. Specifically, the ACF 110 is larger in planar size than the drive IC chip 109, and the ACF 110 is arranged to extend outward beyond all four sides of the drive IC chip 109.

However, in the conventional configuration described above, the following problems are encountered.

For example, in order to meet requirements such as for achieving the ease of the layout and reducing the size of the display panel, it may be necessary to arrange the drive IC chip 109 closer to a glass edge 101a (or 101b) of the two opposite glass edges 101a and 101b (see FIG. 8) of the matrix substrate 101. In this case, since, in the conventional configuration, the ACF 110 extends outward more than the drive IC chip 109, the distance in which the drive IC chip 109 can be brought close to the glass edge 101a is reduced accordingly. When the accuracy with which the ACF 110 is bonded is low, in the conventional configuration, for example, the ACF 110 may extend beyond the glass edge 101a.

Conventionally, on the sides of the glass edges 101a and 101b of the matrix substrate 101, there are provided alignment marks 113 (see FIG. 8) for position adjustment that are used when the drive IC chip 109 is mounted. However, when the drive IC chip 109 is mounted close to one of the glass edges, that is, the glass edge 101a (or 101b), if the ACF 110 and the alignment marks 113 are prevented from overlapping each other, it is impossible to sufficiently bring the drive IC chip 109 close to the glass edge 101a. Hence, when, in the conventional configuration, the drive IC chip 109 is sufficiently brought close to the glass edge 101a, it is necessary to omit the alignment marks. Thus, a problem is encountered in that the operability is degraded.

As shown in FIG. 11A, a FPC (flexible printed circuit board) 114 is generally connected to the matrix substrate 101. In order to reduce the size, it may be necessary to reduce the width (frame size reduction) in the direction indicated by the arrow L of FIG. 11A. In this case, in the conventional configuration (see FIG. 8; the configuration in which the ACF 110 is larger in area than the drive IC chip 109), a problem may be encountered when the FPC 114 is connected to the matrix substrate 101. Specifically, for example, as shown in FIG. 11B, an ACF 115 for connecting the FPC 114 overlaps the ACF 110 for mounting the drive IC chip 109, and the FPC 114 may be insufficiently connected (for example, the FPC 114 is more likely to curl up). FIGS. 11A and 11B are diagrams illustrating the problem encountered in the conventional liquid crystal display panel; FIG. 11A is a diagram obtained by viewing the liquid crystal display panel from above, and FIG. 11B is a diagram obtained by viewing part of the liquid crystal display panel from its side surface.

In view of the foregoing problems, an object of the present invention is to provide a display panel in which an IC chip is mounted on a panel substrate and its size is easily reduced. Another object of the present invention is to provide a display panel in which an IC chip is easily mounted in an area close to an edge surface of a panel substrate. Yet another object of the present invention is to provide a display device including the display panel that achieves the objects described above.

Means for Solving the Problem

To achieve the above objects, a display panel according to the present invention is a display panel in which a drive IC chip including a circuit for driving a display region where an image is displayed is mounted on a panel substrate. The display panel includes: a plurality of bump electrodes formed on a surface of the drive IC chip that faces the panel substrate; a plurality of electrode pads formed on the panel substrate such that the electrode pads are electrically connected to the bump electrodes; and an anisotropic conductive film that is interposed between the panel substrate and the drive IC chip and that electrically connects the bump electrodes and the electrode pads together. In the display panel, the anisotropic conductive film is arranged to extend beyond all side surfaces other than one specific side surface of the drive IC chip.

In this configuration, the anisotropic conductive film (ACF) is arranged to extend beyond all the side surfaces other than the one specific side surface of the drive IC chip. In other words, in this configuration, the ACF does not extend beyond the one side surface of the drive IC chip. With this configuration, for example, it is possible to reduce the size of the display panel. With this configuration, it is also possible to mount the IC chip as close to an end surface of the panel substrate as possible.

In a specific example of the configuration of the display panel described above, the drive IC chip may be arranged to be displaced toward any one of two opposite end surfaces of the panel substrate, and the specific side surface may be a side surface on the side toward which the drive IC chip is arranged to be displaced among a plurality of side surfaces of the drive IC chip. In this type of configuration, it is also possible to arrange the drive IC chip as close to an end surface of the panel substrate as possible. In this configuration, alignment marks used for adjusting the position of the drive IC chip may be provided near the two end surfaces of the panel substrate. With this configuration, it is also possible to arrange the drive IC chip as close to an alignment mark as possible. In other words, with this configuration, it is possible to arrange the IC chip as close to the end surface as possible without degrading the function of the alignment marks. Since the drive IC chip can be mounted using the alignment marks, when the drive IC chip is arranged as close to the end surface, it is possible to prevent the workability from being degraded.

In another specific example of the configuration of the display panel described above, a connection portion for connecting a flexible printed circuit board may be provided on the panel substrate such that the connection portion is adjacent to a position where the drive IC chip is mounted, and the specific side surface may be a side surface that is adjacent to the connection portion among a plurality of side surfaces of the drive IC chip. In this type of configuration, even when the position where the flexible printed circuit board (FPC) is connected and the position where the drive IC chip is mounted are close to each other, it is possible to prevent the FPC from being unsatisfactorily connected. In other words, it is possible to easily reduce the size of the display panel of the present invention.

The display panel configured as described above may include: a pair of glass substrates arranged opposite each other; and liquid crystal sandwiched between the pair of glass substrates. In the display panel, one of the pair of glass substrates may be larger than the other of the pair of glass substrates, and the panel substrate may be the larger substrate among the pair of glass substrates. Thus, it is possible to achieve the above objects in the liquid crystal display panel.

In the display panel configured as described above, the drive IC chip may be formed substantially in a shape of a quadrangular prism, and the anisotropic conductive film may be arranged to extend beyond the three side surfaces other than the one specific side surface. In this configuration, fillets of the anisotropic conductive film are formed on the three side surfaces. Thus, it is possible to acquire a sufficient amount of strength with which the drive IC chip is mounted.

In the configuration described above, when accuracy with which the drive IC chip is mounted on the panel substrate, in a direction perpendicular to the specific side surface, is ±a mm, and accuracy with which the anisotropic conductive film is bonded to the panel substrate, in the direction perpendicular to the specific side surface, is ±b mm, a distance of d mm from the specific side surface to at least one of the bump electrodes arranged closest to the specific side surface preferably satisfies equation (1) below.

$$d \geq 2(a+b) \tag{1}$$

With this configuration, even when variations in accuracy of the operation are present, it is possible to cover the bump electrodes with the ACF without the ACF being always extended beyond one specific side surface of the drive IC chip. In other words, with this configuration, it is possible to reduce the possibility of occurrence of a defective item at the time of production of display panels.

To achieve the above objects, a display device according to the present invention includes a display panel and a backlight device attached to the side of a back surface of the display panel. As the above-mentioned display panel, the display panel configured as described above is used.

With this configuration, since the size of the display panel is reduced, it is possible to reduce the size of the display device. The drive IC chip mounted on the display panel is appropriately arranged close to the end surface of the panel substrate due to, for example, ease of the layout. This makes it easy to design the display device.

Advantages of the Invention

According to the present invention, it is possible to provide a display panel in which an IC chip is mounted on a panel substrate and its size is easily reduced. According to the present invention, it is possible to provide a display panel in which an IC chip is easily mounted in an area close to an edge surface of a panel substrate. According to the present invention, it is possible to provide a display device which includes the display panel described above such that its size is easily reduced.

BRIEF DESCRIPTION OF DRAWINGS

FIG. [1] A schematic plan view showing the configuration of a liquid crystal display panel of a first embodiment;

FIG. [2A] A schematic cross-sectional view showing the configuration of the liquid crystal display panel of the first embodiment and taken along line A-A of FIG. 1;

Figure 1:
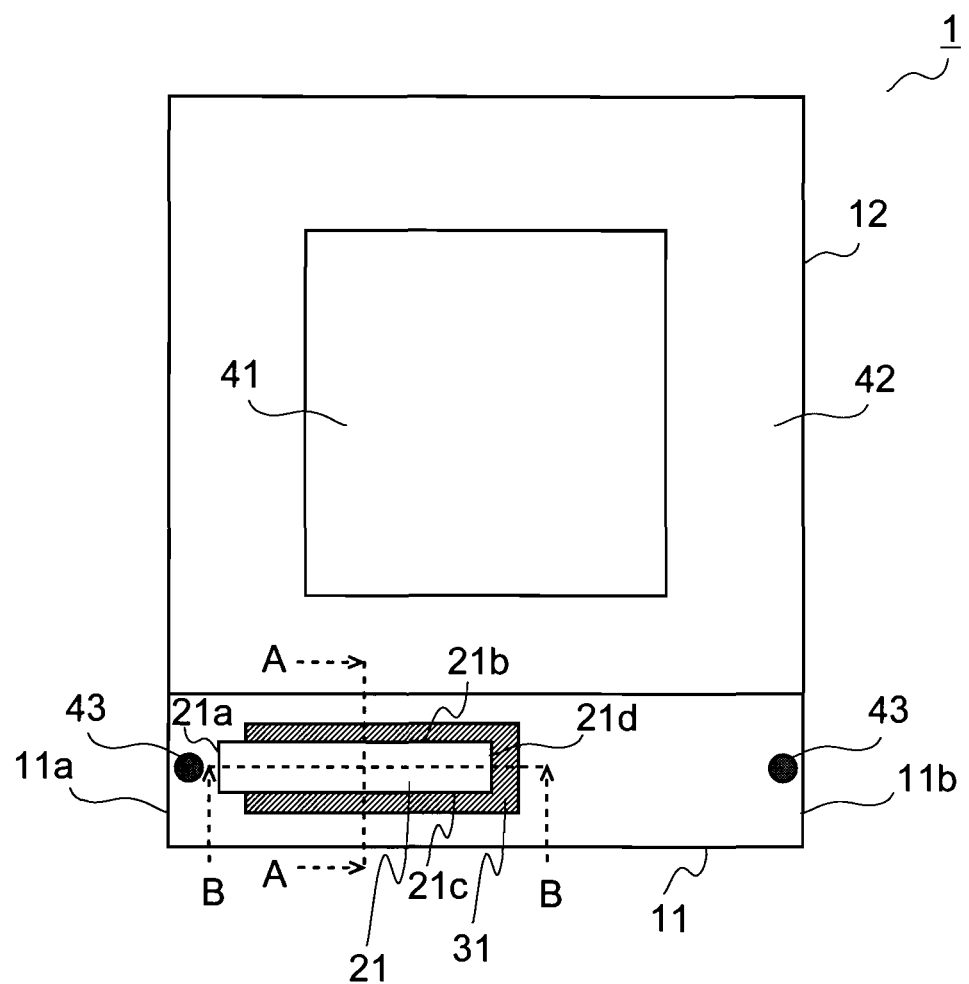
Figure 4:
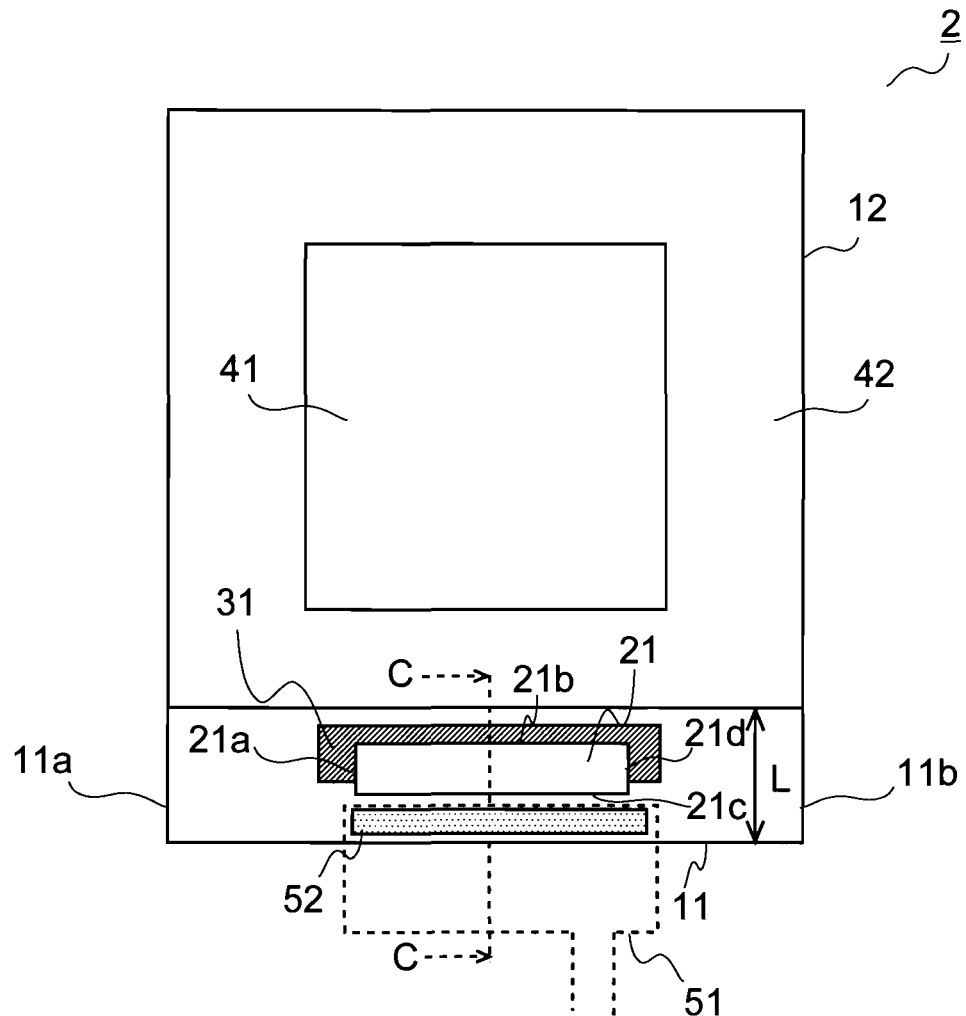
Figure 8:
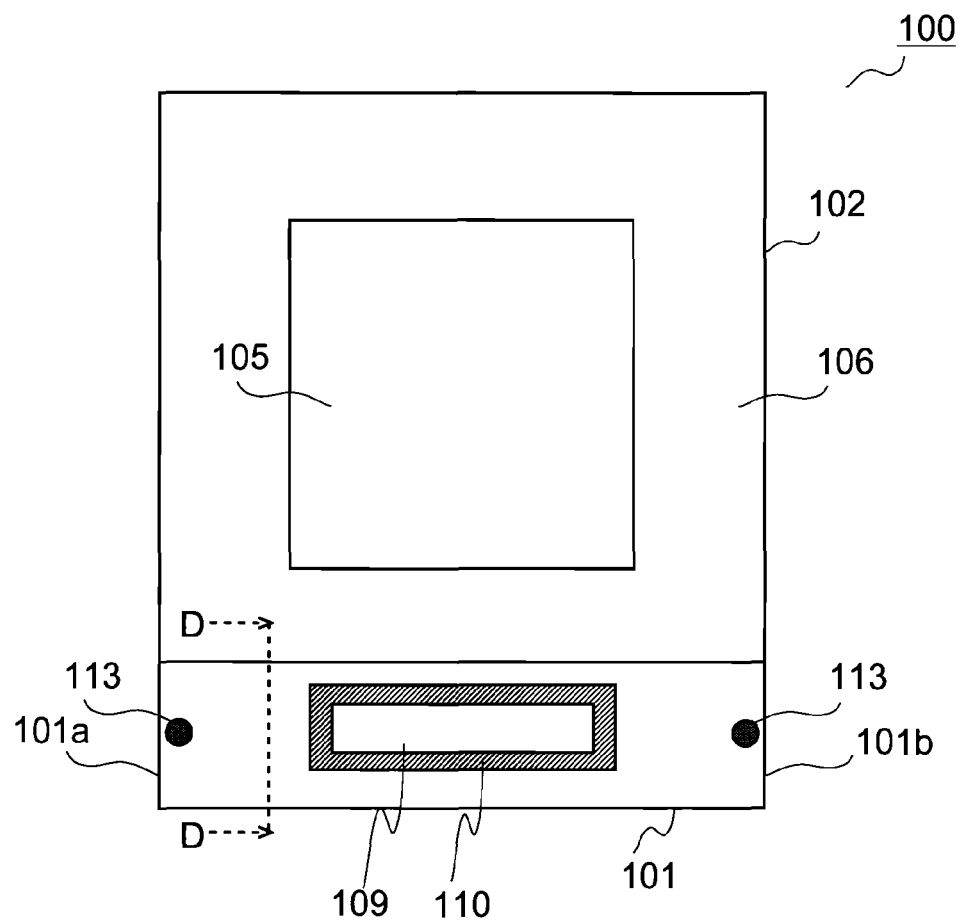
Figure 9:
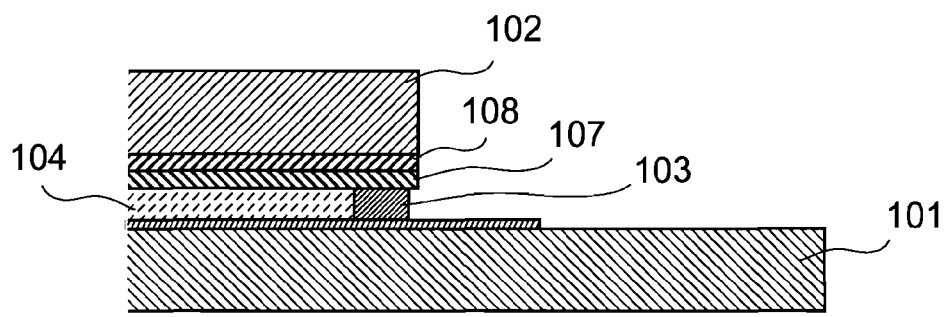
Figure 10:
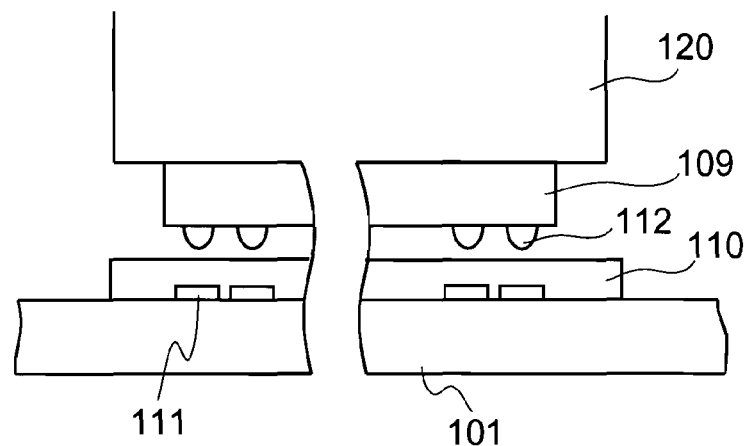
Figure 11A:
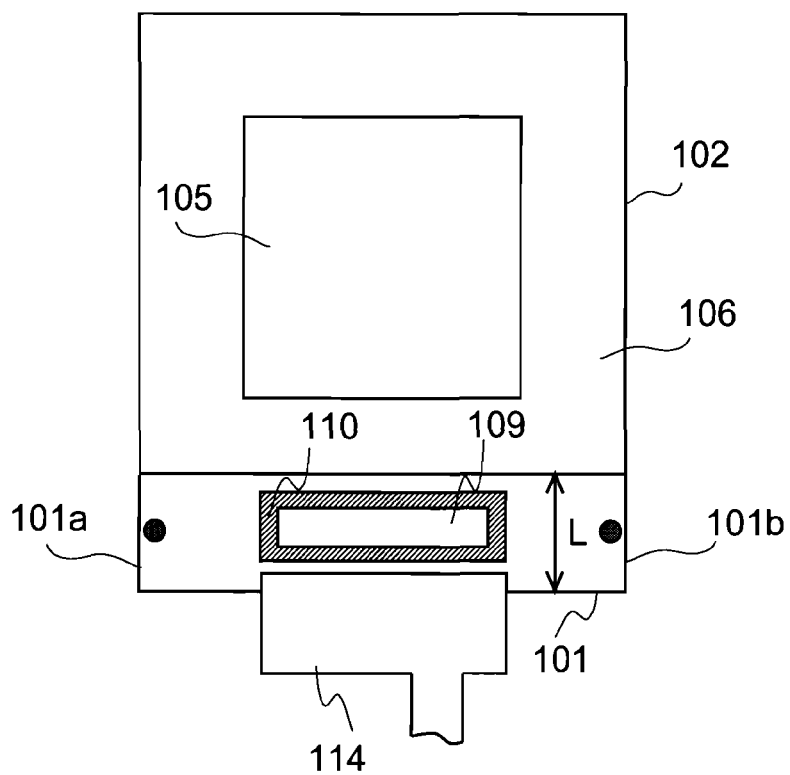
Figure 11B:
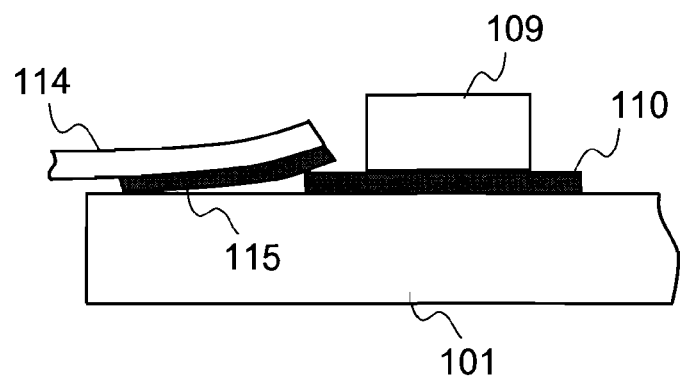

FIG. [2B] A schematic cross-sectional view showing the configuration of the liquid crystal display panel of the first embodiment and taken along line B-B of FIG. 1;

FIG. [3] A schematic plan view showing the configuration of a drive IC chip mounted on the liquid crystal display panel of the first embodiment;

FIG. [4] A schematic plan view showing the configuration of a liquid crystal display panel of a second embodiment;

FIG. [5] A schematic cross-sectional view showing the configuration of the liquid crystal display panel of the second embodiment and taken along line C-C of FIG. 4;

FIG. [6] A schematic plan view showing the configuration of a drive IC chip mounted on the liquid crystal display panel of the second embodiment;

FIG. [7] A schematic cross-sectional view showing the configuration of the liquid crystal display panel of the present embodiment;

FIG. [8] A schematic plan view showing the configuration of a conventional liquid crystal display panel;

FIG. [9] A schematic cross-sectional view showing the configuration of the conventional liquid crystal display panel and taken along line D-D of FIG. 8;

FIG. [10] A diagram illustrating a procedure for mounting the drive IC chip on a matrix substrate by a COG method;

FIG. [11A] A diagram illustrating a problem encountered in the conventional liquid crystal display panel and obtained by viewing the liquid crystal display panel from above;

FIG. [11B] A diagram illustrating the problem encountered in the conventional liquid crystal display panel and obtained by viewing part of the liquid crystal display panel from its side surface.

BEST MODE FOR CARRYING OUT THE INVENTION

Embodiments of a display panel of the present invention and a display device using it will be described below with reference to the accompanying drawings. As an example of the display panel, a liquid crystal display panel will be described below.

(First Embodiment of a Display Panel)

Figure 2A:
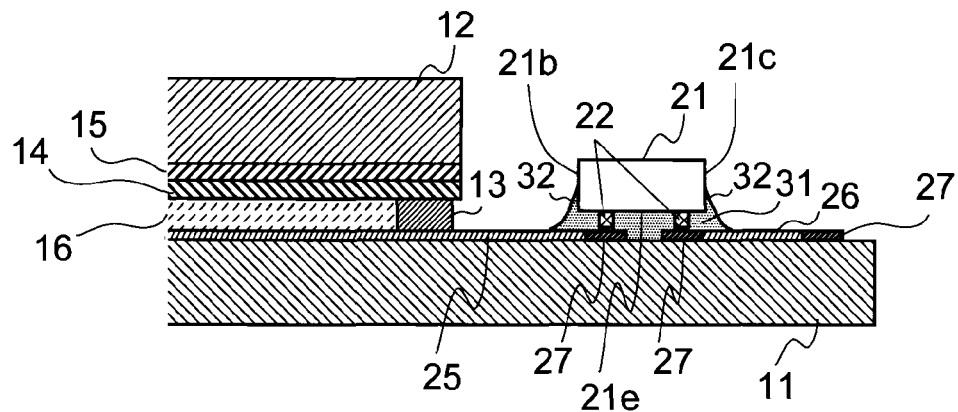
Figure 2B:
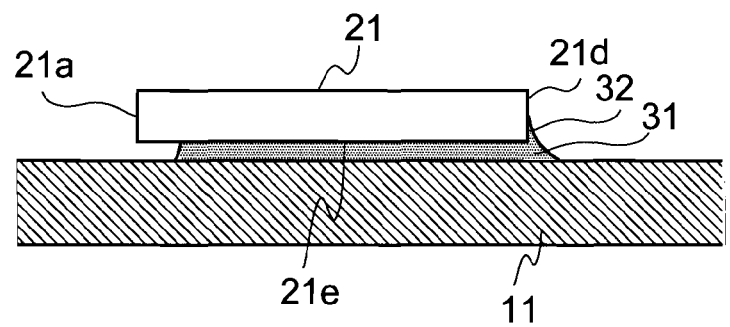
Figure 3:
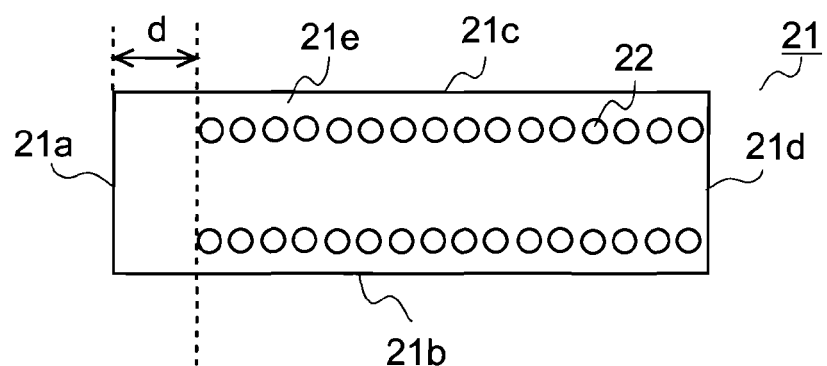

A liquid crystal display panel of a first embodiment will be described with reference to FIGS. 1 to 3. FIG. 1 is a schematic plan view showing the configuration of the liquid crystal display panel of the first embodiment. FIGS. 2A and 2B are schematic cross-sectional views of the liquid crystal display panel of the first embodiment; FIG. 2A is a cross-sectional view taken along line A-A of FIG. 1, and FIG. 2B is a cross-sectional view taken along line B-B of FIG. 1. FIG. 3 is a schematic plan view showing the configuration of a drive IC chip mounted on the liquid crystal display panel of the first embodiment. FIG. 3 is a diagram obtained by viewing the drive IC chip from its lower surface (where bump electrodes are provided).

As shown in FIGS. 1, 2A and 2B, the liquid crystal display panel 1 of the first embodiment includes a first panel substrate 11, a second panel substrate 12, liquid crystal 16 and the drive IC chip 21. In the liquid crystal display panel 1, as shown in FIG. 1, a predetermined region substantially in the middle portion of the liquid crystal display panel 1 is a display region 41 where a liquid crystal display (the display of an image) is produced. The portion outside the display region 41 is a non-display region 42 where a liquid crystal display is not produced.

The first panel substrate 11 and the second panel substrate 12 are formed of glass. The first panel substrate 11 and the second panel substrate 12 are arranged such that the main surfaces (the largest surfaces) thereof face each other, and are bonded by a frame-shaped seal 13 with a predetermined gap left therebetween in a vertical direction. The first panel substrate 11 and the second panel substrate 12 are substantially rectangular when viewed in plan view; the first panel substrate 11 is larger than the second panel substrate 12. Specifically, as shown in FIG. 1, their sizes in a lateral direction are substantially equal to each other; in a vertical direction, the first panel substrate 11 is larger in size than the second panel substrate 12, and the lower side of the first panel substrate 11 extends with respect to the second panel substrate 12.

On the surface of the first panel substrate 11, a plurality of switching elements such as TFTs (thin film transistor) and pixel electrodes (they are not shown) to which the switching elements are connected are arranged in a matrix. A plurality of scanning signal lines and data signal lines (they are not shown) that drive the switching elements are formed such that they intersect each other. On the first panel substrate 11, a plurality of output wires 25 connected to the scanning signal lines or the data signal lines, input wires 26 for inputting signals from outside and electrode pads 27 (see FIG. 2A for those) are provided. In FIG. 1, the wiring pattern is omitted.

On the other hand, on the second panel substrate 12, an opposite electrode 14 and a color filter 15 are formed (see FIG. 2A).

Liquid crystal 16 is sealed in the space enclosed by the first panel substrate 11, the second panel substrate 12 and the frame-shaped seal 13. The optical characteristic (light transmittance) of the liquid crystal 16 is changed by applying voltage thereto. The display region 41 (see FIG. 1) described above is formed by sandwiching the liquid crystal 16 between the pixel electrodes and the opposite electrode 14.

The drive IC chip 21 is an IC chip that includes a circuit for diving the display region 41. In the present embodiment, the drive IC chip 21 is an IC chip into which a drive circuit generating data signals and a drive circuit generating scanning signals are integrated. Although, in the present embodiment, the drive IC chip 21 is provided with the drive circuits generating the data signal and the scanning signals, the present invention is not limited to this configuration. For example, the drive circuit generating the scanning signals may be provided as a monolithic circuit on the first panel substrate 11, and the drive IC chip 21 may include only the drive circuit generating the data signals.

On the portion of the first panel substrate 11 extending outward more than the second panel substrate 12, the drive IC chip 21 is mounted by the COG method. In the present embodiment, as shown in FIG. 1, the drive IC chip 21 is arranged to be displaced toward a left glass edge 11a among the two opposite glass edges (two end surfaces) 11a and 11b of the first panel substrate 11.

When the drive IC chip 21 is mounted on the first panel substrate 11, an anisotropic conductive film (ACF) 31 is used. Specifically, the ACF 31 is interposed between the drive IC chip 21 and the first panel substrate 11, and thus the drive IC chip 21 and the first panel substrate 11 are bonded together. A plurality of bump electrodes 22 provided on the drive IC chip 21 and a plurality of electrode pads 27 provided on the first panel substrate 11 are electrically connected by the ACF 31.

A procedure for mounting the drive IC chip 21 on the first panel substrate 11 is as follows. The ACF 31 is placed on a predetermined region of the first panel substrate 11. Thereafter, the electrode pads 27 formed on the first panel substrate 11 and the bump electrodes 22 of the drive IC chip 21 are positioned such that they coincide with each other, and the drive IC chip 21 and the first panel substrate 11 are bonded by thermocompression bonding.

The drive IC chip 21 of the present embodiment is formed substantially in the shape of a quadrangular prism (more specifically, substantially in the shape of a rectangular parallelepiped). The drive IC chip 21 is mounted on the first panel substrate 11 such that only the entire side surface 21a close to the glass edge 11a among the four side surfaces 21a to 21d of the drive IC chip 21 extends beyond the ACF 31. In other words, the ACF 31 is arranged to extend beyond the three side surfaces 21b to 21d other than the side surface 21a of the drive IC chip 21.

The four side surfaces 21a to 21d are surfaces that are substantially perpendicular to a surface 21e on which the bump electrodes 22 of the drive IC chip 21 are formed. The side surface 21a corresponds to an embodiment of one specific side surface of the present invention.

As shown in FIGS. 2A and 2B, fillets 32 of the ACF 31 are formed on the three side surfaces 21b to 21d present on the ACF 31. Hence, the drive IC chip 21 is mounted on the first panel substrate 11 with the fillets 32 formed on the three side surfaces 21b to 21d among the four side surfaces 21a to 21d. Therefore, the drive IC chip 21 is mounted with sufficient strength.

Since the ACF 31 does not extend beyond the side surface 21a of the drive IC chip 21, the bump electrodes formed on the drive IC chip 21 need to be located apart from the side surface 21a as shown in FIG. 3. This is because all the bump electrodes 22 provided on the drive IC chip 21 are electrically connected to the electrode pads 27 using the ACF 31. Since the ACF 31 extends beyond the other three side surfaces 21b to 21d, the bump electrodes 22 may or may not be located apart from those side surfaces.

How to determine what approximate distance the bump electrodes 22 should be located apart from the side surface 21a of the drive IC chip 21 in the liquid crystal display panel 1 of the present embodiment will be described below.

In the liquid crystal display panel 1 of the present embodiment, it is desired to bring the drive IC chip 21 as close to the glass edge 11a as possible. Hence, in the present embodiment, the ACF 31 does not extend beyond the side surface 21a of the drive IC chip 21. Therefore, with reference to the side surface 21a of the drive IC chip 21, it is possible to determine the position in which the drive IC chip 21 is mounted.

In the present embodiment, on areas close to the two glass edges 11a and 11b of the first panel substrate 11, there are provided alignment marks 43 that are used for position adjustment when the drive IC chip 21 is mounted. Hence, in the present embodiment, since the drive IC chip 21 is desired to be brought as close to the glass edge 11a as possible, the side surface 21a of the drive IC chip 21 is brought as close to the alignment marks 43 as possible so that the drive IC chip 21 does not cover the alignment marks 43. When the drive IC chip 21 is mounted on the first panel substrate 11, the drive IC chip 21 is slightly displaced but the accuracy with which the drive IC chip 21 is mounted is highly satisfactory. Although the accuracy with which the drive IC chip 21 is mounted, in the direction perpendicular to the side surface 21a of the drive IC chip 21, differs depending on a device used, for example, it is about ±0.01 mm. In the following description, the accuracy with which the drive IC chip 21 is mounted, in the direction perpendicular to the side surface 21a of the drive IC chip 21, is assumed to be ± b mm.

On the other hand, the accuracy with which the ACF 31 is bonded, especially in the direction perpendicular to the side surface 21a, tends to be low. Although the accuracy with which the ACF 31 is bonded differs depending on a device used, for example, it is about ±0.5 mm. In the following description, the accuracy with which the ACF 31 is bonded, in the direction perpendicular to the side surface 21a, is assumed to be ±b mm.

In the present embodiment, it is necessary to prevent the ACF 31 from always extending beyond the side surface 21a of the drive IC chip 21. In consideration of this point and the accuracies described above, a target position where the ACF 31 is bonded is as follows. The ACF 31 needs to be bonded such that the end of the ACF 31 on the side of the glass edge 11a is displaced (a+b) mm or more, from the side surface 21a of the drive IC chip 21 that has been mounted into position, in the direction away from the glass edge 11a (in the direction toward the glass edge 11b).

In addition to the foregoing, the ACF 31 needs to be present under the bump electrodes 22 of the drive IC chip 21 without fail. Hence, in consideration of the target position where the ACF 31 is bonded, it is necessary to determine the position such that the bump electrodes 22 are located within the ACF 31 even when the position where the ACF 31 is bonded is most displaced toward the glass edge 11b and the drive IC chip 21 is most displaced toward the glass edge 11a. Specifically, when a distance from the side surface 21a to the bump electrode 22 arranged closest to the side surface 21a is assumed to be "d", "d" needs to satisfy equation (1) below.

$$d \geq 2(a+b) \tag{1}$$

More specifically, when a=0.01 and b=0.5, the bump electrode 22 needs to be formed 1.02 mm or more away from the side surface 21a. For example, when a=0.01 and b=0.3, the bump electrode 22 needs to be formed 0.62 mm or more away from the side surface 21a.

Needless to say, there is an upper limit of the distance "d". This is determined such as by the size of the drive IC chip 21 and what approximate distance the bump electrodes 22 can be formed away from each other As described above, since, in the liquid crystal display panel 1 of the first embodiment, the ACF 31 is prevented from always extending beyond the side surface 21a of the drive IC chip 21, the drive IC chip 21 can be arranged as close to the alignment marks 43 as possible. When the conventional drive IC chip 21 is arranged as close to the alignment marks 21 as possible, the ACF 31 overlaps the alignment marks 43, and thus the alignment marks 43 disadvantageously fail to function. However, such a disadvantage can be overcome. Hence, in the liquid crystal display panel of the present embodiment, its assembly workability is also satisfactory. When the alignment marks are not provided, it is possible to mount the drive IC chip 21 as close to the glass edge 11a (or 11b) as possible. Thus, it is also possible to closely mount electronic components and the like on the first panel substrate 11 (in other words, it is possible to reduce the size).

Moreover, since, in the present embodiment, on the three side surfaces 21b to 21d other than the side surface 21a of the drive IC chip 21 mounted on the first panel substrate 11, the fillets 32 for the ACF 31 are formed, the reliability of the strength with which the drive IC chip 21 is mounted is high.

(Second Embodiment of a Display Panel)

Figure 5:
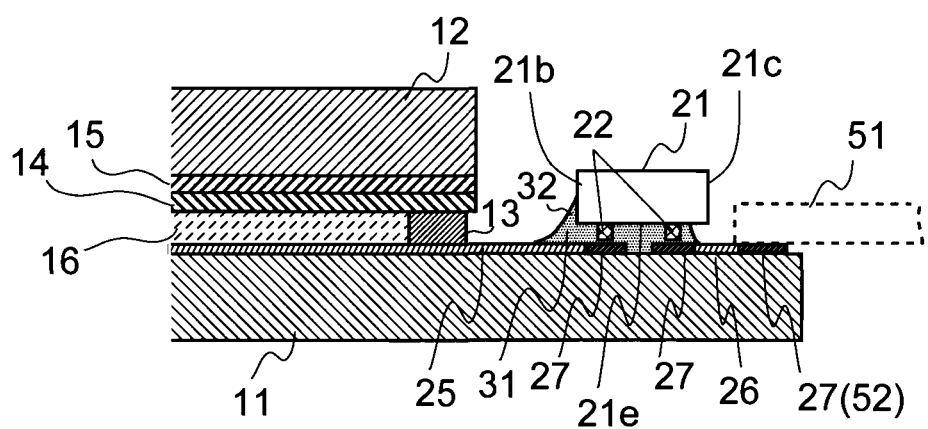
Figure 6:
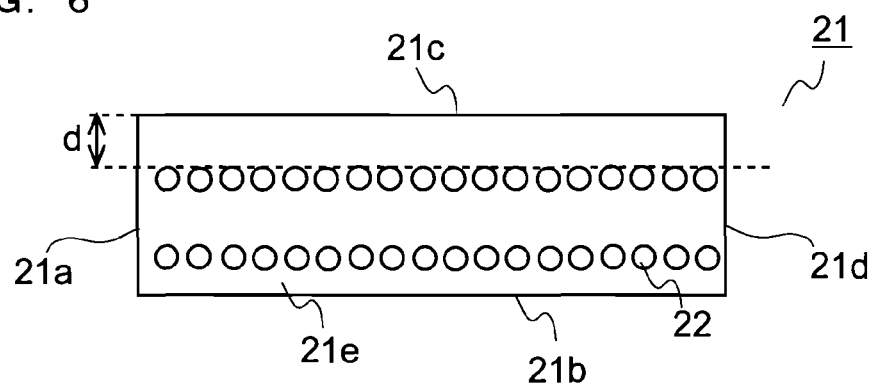

The liquid crystal display panel of a second embodiment will now be described with reference to FIGS. 4 to 6. FIG. 4 is a schematic plan view showing the configuration of the liquid crystal display panel of the second embodiment. FIG. 5 is a schematic cross-sectional view showing the configuration of the liquid crystal display panel of the second embodiment and taken along line C-C of FIG. 4. FIG. 6 is a schematic plan view showing the configuration of a drive IC chip mounted on the liquid crystal display panel of the second embodiment.

The liquid crystal display panel 2 of the second embodiment is the same as the liquid crystal display panel 1 of the first embodiment except for the configuration in which the drive IC chip 21 is mounted on the first panel substrate 11 and except that length L shown in FIG. 4 is smaller than that in the first embodiment. Hence, like parts are identified with like symbols, and their description will not be repeated unless otherwise required.

In the liquid crystal display panel 2 of the second embodiment, the drive IC chip 21 including the circuit for driving the display region 41 is also mounted by the COG method on the portion of the first panel substrate 11 extending outward more than the second panel substrate 12. However, the drive IC chip 21 is mounted not close to either of the glass edges 11*a* and 11*b* but substantially in the middle of the portion described above.

Since the liquid crystal display panel 2 of the second embodiment satisfies the requirement for frame size reduction, the length L shown in FIG. 4 is very narrow. Thus, the space between a connection portion 52 connecting a FPC 51 for transmitting signals to the drive IC chip 21 and the like and the drive IC chip 21 is also very narrow.

Hence, in the present embodiment, a unique method is employed to bond the ACF 31 used for mounting the drive IC chip 21. Specifically, the ACF 31 is arranged to extend beyond the three side surfaces 21*a*, 21*b* and 21*d* other than the side surface 21*c*. In other words, the drive IC chip 21 is mounted on the first panel substrate 11 such that only the entire side surface 21*c* adjacent to the connection portion 52 among the four side surfaces 21*a* to 21*d* of the drive IC chip 21 extends beyond the ACF 31.

In this way, unlike the conventional configuration in which the ACF 31 extends beyond all the four side surfaces 21*a* to 21*d* of the drive IC chip 21, an ACF for connecting the FPC 51 is prevented from overlapping the ACF 31 for mounting the drive IC chip 21. The configuration of the present embodiment is therefore advantageous in frame size reduction.

In this configuration, as shown in FIG. 6, the bump electrodes 22 formed on the drive IC chip 21 need to be located apart from the side surface 21*c*. This is because all the bump electrodes 22 provided on the drive IC chip 21 need to be electrically connected to the electrode pads 27 using the ACF 31. In this case, as in the first embodiment, the distance "d" from the side surface 21*c* to the bump electrode 22 arranged closest to the side surface 21*c* needs to satisfy equation (1) below.

$$d \geq 2(a+b) \quad (1)$$

where, in the present embodiment, the accuracy with which the drive IC chip 21 is mounted, in the direction perpendicular to the side surface 21*c* of the drive IC chip 21, is assumed to be ±a mm, and the accuracy with which the ACF 31 is bonded, in the direction perpendicular to the side surface 21*c*, is assumed to be ±b mm.

The accuracy with which the ACF 31 is bonded, in the direction perpendicular to the side surface 21*c*, is higher than the accuracy with which the ACF 31 is bonded, in the direction perpendicular to the side surface 21*a*, and thus it is possible to reduce the distance "d" as compared with the first embodiment.

In the present embodiment, as in the first embodiment, since the drive IC chip 21 is mounted on the first panel substrate 11 with the fillets 32 for the ACF 31 formed on the three side surfaces 21*a*, 21*b* and 21*d*, the reliability of the strength with which the drive IC chip 21 is mounted is high.

(Embodiment of a Display Device)

Figure 7:
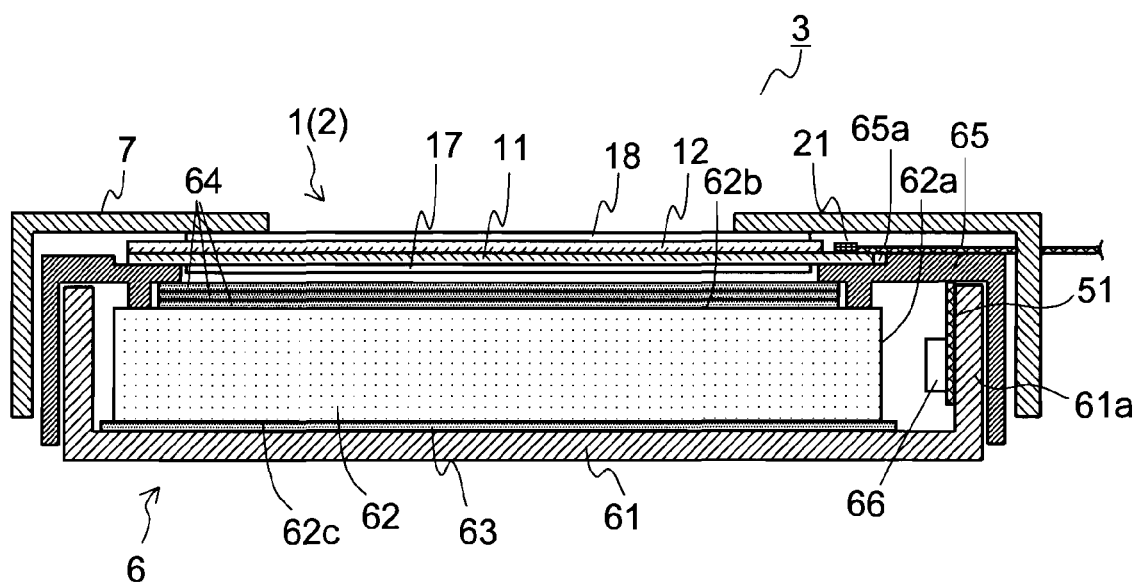

An embodiment of a display device including either the liquid crystal display panel of the first embodiment or the liquid crystal display panel of the second embodiment will now be described with reference to FIG. 7. FIG. 7 is a schematic cross-sectional view of the display device including the liquid crystal display panel of the present embodiment.

As shown in FIG. 7, the display device 3 mainly includes the liquid crystal display panel 1 (2), a backlight device 6 and a bezel 7. Although the liquid crystal display panel 1 (2) is configured as described above, a light polarization plate 18 and a light polarization plate 17 are attached to the upper and lower surfaces of the liquid crystal display panel 1 (2), respectively.

The backlight device includes a lower chassis 61, a light guide plate 62, a reflective sheet 63, optical sheets 64, an upper chassis 65, light emitting diodes (LED) 66.

The lower chassis 61 is box-shaped and accommodates the light guide plate 62, the reflective sheet 63 and the optical sheets 64. The lower chassis 61 is formed of a high thermal conductivity material (for example, metal), and thus heat generated by the LEDs 66 attached to a side surface portion 61*a* is easily dissipated. In other words, the lower chassis 61 of the present embodiment also functions as a heat dissipation plate.

The light guide plate 62 is formed of, for example, acryl resin, and is formed substantially in the shape of a rectangular parallelepiped. On the side of the lower surface 62*c* of the light guide plate 62, the reflective sheet 63 is provided such that part of light traveling through the light guide plate 62 can be reflected. Thus, the light that has entered the light guide plate 62 through its side surface 62*a* emanates from its upper surface 62*b* as planar shaped light. On the side of the upper surface 62*b* of the light guide plate 62, three optical sheets 64 are arranged. The optical sheets 64 are provided to achieve, for example, uniformity and evenness of the light emitted from the light guide plate 62; the number of sheets is not limited to that of the present embodiment.

The upper chassis 65 is formed of, for example, resin, and is placed over the lower chassis 61. The light guide plate 62, the reflective sheet 63 and the optical sheets 64 are held between the upper chassis 65 and the lower chassis 61. In the upper chassis 65, an opening portion is formed through which the light emitted from the light guide plate 62 passes; the upper chassis 65 is a frame member that is formed in the shape of a frame. A step portion 65*a* is formed around the perimeter of the opening portion of the upper chassis 65; the perimeter of the liquid crystal display panel 1 (2) can be placed thereon.

A plurality of LEDs 66 are arranged near the side surface 62*a* of the light guide plate 62. The LEDs 66 are spaced a predetermined distance away from each other in a line along a direction perpendicular to the plane of FIG. 7. Specifically, the LEDs 66 are mounted on the FPC 51; the FPC 51 is attached to the side surface portion 61*a* of the lower chassis 61 and thus the LEDs 66 are arranged near the side surface 62*a* of the light guide plate 62. The FPC 51 and the side surface portion 61*a* of the lower chassis 61 are bonded together by, for example, a double-faced adhesive.

The bezel 7 is placed over the liquid crystal display panel 1 (2) whose perimeter is placed on the step portion 65a of the upper chassis 65 in the backlight device 6, and thereby fixes the liquid crystal display panel 1 (2) and the backlight device 6 together.

The display device 3 of the present embodiment is configured as described above; it is possible to reduce the size of the liquid crystal display panel 1 (2), and the size of the display device 3 is also easily reduced.

(Others)

The present invention is not limited to the embodiments described above. Many modifications are possible without departing from the scope of the present invention.

For example, the embodiments described above deal with the case where one drive IC chip is mounted on the display panel. However, the present invention is not limited to this configuration; the present invention is applicable to a display panel on which a plurality of drive IC chips are mounted. For example, when two drive IC chips are arranged side by side, the ACF may not extend beyond the side surface close to the adjacent drive IC chips among the four side surfaces of the drive IC chips, and the ACF may extend beyond the remaining three side surfaces. In this way, it is possible to reduce the space between the two drive IC chips, and this is advantageous in high-density mounting.

In the present invention, only the lower portion of the first panel substrate 11 extends outward more than the second panel substrate. However, the present invention is not limited to this configuration. For example, the present invention is applicable to a case where, in addition to the lower portion, either of the left portion and the right portion of the first panel substrate 11 extends outward more than the second panel substrate, and where the drive IC chip is mounted on those portions.

In the above description, the liquid crystal display panel is used as the display panel; the present invention is not limited to this configuration. That is, the present invention is applicable to a display panel and a display device that use an electrooptic material other than liquid crystal as an optical switch material.

INDUSTRIAL APPLICABILITY

According to the present invention, in a display panel in which an IC chip is mounted on a panel substrate, its size is easily reduced. Moreover, according to the present invention, an IC chip is easily mounted in an area close to an edge surface of a panel substrate. That is, the present invention is useful as an invention of a display panel.

LIST OF REFERENCE SYMBOLS 1, 2 Liquid crystal display panel (display panel)
3 Display device
6 Backlight device
11 First panel substrate
11a, 11b Glass edge (end surface of the panel substrate)
12 Second panel substrate
16 Liquid crystal
21 Drive IC chip
21a to 21d Side surface of the drive IC chip
21e Surface where bump electrodes are formed
22 Bump electrode
27 Electrode pad
31 ACF (anisotropic conductive film)
32 Fillet
41 Display region
51 FPC (flexible printed circuit board)
52 Connection portion

The invention claimed is:

1. A display panel in which a drive IC chip including a circuit for driving a display region where an image is displayed is mounted on a panel substrate, the display panel comprising:
   a plurality of bump electrodes formed on a surface of the drive IC chip that faces the panel substrate;
   a plurality of electrode pads formed on the panel substrate such that the electrode pads are electrically connected to the bump electrodes; and
   an anisotropic conductive film that is interposed between the panel substrate and the drive IC chip and that electrically connects the bump electrodes and the electrode pads together, wherein
   the anisotropic conductive film is arranged to extend beyond all side surfaces other than one specific side surface of the drive IC chip,
   the drive IC chip is formed substantially in a shape of a quadrangular prism,
   the anisotropic conductive film is arranged to extend beyond the three side surfaces other than the one specific side surface, and
   when accuracy with which the drive IC chip is mounted on the panel substrate, in a direction perpendicular to the specific side surface, is ±a mm, and accuracy with which the anisotropic conductive film is bonded to the panel substrate, in the direction perpendicular to the specific side surface, is ±b mm, a distance of d mm from the specific side surface to at least one of the bump electrodes arranged closest to the specific side surface satisfies equation (1) below $$d \geq 2(a+b) \tag{1}$$

2. The display panel of claim 1,
   wherein the drive IC chip is arranged to be displaced toward any one of two opposite end surfaces of the panel substrate, and
   the specific side surface is a side surface on a side toward which the drive IC chip is arranged to be displaced among a plurality of side surfaces of the drive IC chip.

3. The display panel of claim 2,
   wherein alignment marks used for adjusting a position of the drive IC chip are provided near the two end surfaces of the panel substrate.

4. The display panel of claim 1,
   wherein a connection portion for connecting a flexible printed circuit board is provided on the panel substrate such that the connection portion is adjacent to a position where the drive IC chip is mounted, and
   the specific side surface is a side surface that is adjacent to the connection portion among a plurality of side surfaces of the drive IC chip.

5. The display panel of claim 1, further comprising:
   a pair of glass substrates arranged opposite each other; and
   liquid crystal sandwiched between the pair of glass substrates,
   wherein one of the pair of glass substrates is larger than the other of the pair of glass substrates, and
   the panel substrate is the larger substrate among the pair of glass substrates.

6. The display panel of claim 1,
   wherein fillets of the anisotropic conductive film are formed on the three side surfaces.

7. A display device comprising:
a display panel; and
a backlight device attached to a side of a back surface of the display panel,
wherein, as said display panel, the display panel of claim 1 is used.

8. A display device comprising:
a display panel; and
a backlight device attached to a side of a back surface of the display panel,
wherein, as said display panel, the display panel of claim 2 is used.

9. A display device comprising:
a display panel; and
a backlight device attached to a side of a back surface of the display panel,
wherein, as said display panel, the display panel of claim 3 is used.

10. A display device comprising:
a display panel; and
a backlight device attached to a side of a back surface of the display panel,
wherein, as said display panel, the display panel of claim 4 is used.

11. A display device comprising:
a display panel; and
a backlight device attached to a side of a back surface of the display panel,
wherein, as said display panel, the display panel of claim 5 is used.

* * * * *